United States Patent
Han

(10) Patent No.: US 10,665,087 B2
(45) Date of Patent: May 26, 2020

(54) CONTROL SYSTEM AND METHOD

(71) Applicant: Suntech Co., Ltd, Gyeongsangbuk-do (KR)

(72) Inventor: Byong Sam Han, Gyeongsangbuk-do (KR)

(73) Assignee: SUNTECH CO., LTD, Gyeongsangbuk-Do (KR)

( * ) Notice: Subject to any disclaimer, the term of this patent is extended or adjusted under 35 U.S.C. 154(b) by 0 days.

(21) Appl. No.: 16/309,906

(22) PCT Filed: May 24, 2018

(86) PCT No.: PCT/KR2018/005915
§ 371 (c)(1),
(2) Date: Dec. 13, 2018

(87) PCT Pub. No.: WO2018/221889
PCT Pub. Date: Dec. 6, 2018

(65) Prior Publication Data
US 2019/0180602 A1    Jun. 13, 2019

(30) Foreign Application Priority Data
May 30, 2017    (KR) .......................... 10-2017-0066957

(51) Int. Cl.
*G08B 27/00*    (2006.01)
*G06K 7/14*    (2006.01)
(Continued)

(52) U.S. Cl.
CPC .......... *G08B 27/006* (2013.01); *G06K 7/1417* (2013.01); *G06K 19/06037* (2013.01);
(Continued)

(58) Field of Classification Search
CPC ...... G08B 27/00; G08B 27/006; H04W 4/023
See application file for complete search history.

(56) References Cited

U.S. PATENT DOCUMENTS

2016/0029890 A1* 2/2016 Stump .................... G16H 50/30
600/301
2017/0336217 A1* 11/2017 Sueyoshi ............... G01C 21/26

FOREIGN PATENT DOCUMENTS

KR    20140071578 A    12/2014
KR    20150113274 A    8/2015
(Continued)

OTHER PUBLICATIONS

WIPO, Korean International Search Authority, International Search Report and Written Opinion dated Sep. 6, 2018 in International Patent Application No. PCT/KR2018/005915, 11 pages.

*Primary Examiner* — Curtis B Odom
(74) *Attorney, Agent, or Firm* — Masuvalley & Partners

(57) ABSTRACT

The present invention relates to a control system and method. The control system includes worker devices worn by workers to detect and transmit location information, external information, and biometric information and a control server checking the external information and the biometric information detected by the worker devices and determining whether an accident has occurred. The control server selectively transmits an evacuation or rescue order to worker devices around an accident location according to a cause and a range of the accident.

10 Claims, 4 Drawing Sheets

(51) Int. Cl.
*G06K 19/06* (2006.01)
*H04W 4/02* (2018.01)
*H04W 4/08* (2009.01)
G06Q 50/04 (2012.01)
G06Q 10/06 (2012.01)

(52) U.S. Cl.
CPC .......... *H04W 4/023* (2013.01); *H04W 4/025* (2013.01); *H04W 4/08* (2013.01); *G06Q 10/0637* (2013.01); *G06Q 50/04* (2013.01)

(56) References Cited

FOREIGN PATENT DOCUMENTS

| | | |
|---|---|---|
| KR | 20170001300 A | 4/2017 |
| KR | 20170037104 A | 4/2017 |
| WO | WO2008/105578 A1 | 9/2008 |

\* cited by examiner

CONTROL SYSTEM AND METHOD

RELATED APPLICATIONS

This application is the U.S. National Phase of and claims priority to International Patent Application No. PCT/KR2018/005915, International Filing Date May 24, 2018, entitled Control System And Method; which claims benefit of Korean Application No. 10-2017-0066957 filed May 30, 2017; both of which are incorporated herein by reference in their entireties.

TECHNICAL FIELD

The present invention relates to a control system and method, and more particularly, to a control system and method for sensing whether an accident has occurred by acquiring user-specific biometric data, and coping with the accident.

BACKGROUND ART

Generally, in large-scale industrial sites such as large-scale industrial plant and large-scale construction sites, it is difficult for managers to know where workers are, and even when an accident of a worker who works alone occurs, it is difficult to immediately learn of occurrence of the accident.

To solve this problem, Korean Patent Publication No. 10-2011-0109621 ("Safety Management System and Method Thereof" published on Oct. 6, 2011) has suggested a safety management system whose devices for processing workers' personal information and location information are carried. The safety management system receives sensor information on surrounding environments detected by middleware and provides surrounding environment information to the workers.

However, the published patent enables a worker to obtain situation information on surroundings and thus does not offer any advantage from an ordinary situation because there is no means for directly sensing an accident of a worker and a manager cannot perceive an accident which occurs separately from a surrounding situation.

As another technology, Korean Patent No. 10-0854931 ("Apparatus for Safety Management of Worker Using Wireless Sensor Network" registered on Aug. 22, 2008) includes a means for detecting and transmitting a biometric signal of a worker to a management means. However, when an accident occurs to a worker, it is not possible to let others know about the accident, and it is not easy to rapidly rescue the worker because an accurate location of the worker is not available.

Also, since a worker's status is determined by collecting a biometric signal regardless of characteristics of the worker's disease or unique biometric information, an error may occur, and it is difficult to manage worker devices worn by workers.

DISCLOSURE

Technical Problem

To solve the aforementioned problems, the present invention is directed to providing a system and method for extensive and comprehensive industrial safety control.

The present invention is also directed to providing a control system and method for preventing an additional accident by prioritizing rescue or evacuation of surrounding workers according to a type of accident.

The present invention is also directed to providing a control system and method for matching workers with worker devices worn by the workers on a one-to-one basis and determining whether an accident has occurred by comparing the workers' unique biometric information with the worker's biometric information received from a site.

The present invention is also directed to providing a control system and method for systematically managing workers who work in a predetermined range and readily determining a range of an accident by grouping the workers.

Technical Solution

One aspect of the present invention provides a control system which includes worker devices worn by workers to detect and transmit location information, external information, and biometric information and a control server checking the external information and the biometric information detected by the worker devices and determining whether an accident has occurred. The control server selectively transmits an evacuation or rescue order to worker devices around an accident location according to a cause and a range of an accident.

Each of the worker devices may include a Long Term Evolution (LTE) or LTE category M1 (LTE-M) communication module unit configured to enable data and voice communication with the control server and other nearby worker devices; a Global Positioning System (GPS) module unit configured to detect location information; an external information detection unit configured to detect at least one piece of information among surrounding vibrations, voltage, and harmful gas; a biometric information detection unit configured to detect at least one piece of information among a worker's temperature, heart rate, and blood pressure; a camera and a lighting unit configured to take pictures of and illuminate a direction of the worker's sight; a quick response (QR) code provided on a part; a voice input and output unit configured to input and output voice signals; a control unit configured for control; and a memory configured to store an application for matching the worker devices with the worker on a one-to-one basis.

At least the camera and the memory may be installed in a smart phone of the worker, and the workers and the worker devices may be matched with each other on a one-to-one basis by scanning the QR codes with the camera and transmitting an identity (ID) of the application or a phone number to the control server together with a scan result.

When the worker devices are an all-in-one type, the worker and the worker device may be matched with each other on a one-to-one basis by scanning the QR codes for recognizing the worker and transmitting information for identifying the worker device to the control server together with a scan result.

The control server may group other worker devices within a set range from each worker device by checking location information of each of the worker devices and may transmit an evacuation or rescue order to other worker devices in a group of a specific worker device when information detected from the specific worker device indicates an accident situation.

The control server may transmit information on other worker devices in a group, to which each of the worker devices belongs, to each of the worker devices so that the information may be stored in memories, and when an accident occurs, the worker devices may propagate occurrence of the accident to other worker devices in groups stored in memories.

The control server may control a worker device determined to be involved in an accident to keep the lighting unit on or blinking and sound an alarm through the voice input and output unit.

The control server may include a worker information database (DB) configured to store diseases or unique biometric information of the workers and determine whether the biometric information received from the worker devices is abnormal in consideration of the diseases or the unique biometric information of the workers.

Another aspect of the present invention provides a control method including: a) matching, by a control server, workers with worker devices on a one-to-one basis and storing matching information; b) checking location information of the worker devices and grouping worker devices within a set range; and c) when external information or biometric information received by the control server from a specific worker device or worker devices is determined to indicate an accident situation, transmitting an evacuation or rescue order to other worker devices in a group to which the worker device or the worker devices belong.

Operation a) may include receiving results of scanning QR codes for identifying the workers and information for specifying the worker devices from the worker devices or receiving results of scanning QR codes for identifying the worker devices and information for specifying the workers from the worker devices.

The control method may further include transmitting grouping results of operation b) to each of the worker devices so that a specific worker device may store information on other worker devices belonging to the same group as the specific worker device; and propagating, by the worker device from which the accident situation has been detected, the accident situation to other work devices belonging to the same group as the worker device from which the accident situation has been detected.

The control server may control the worker device from which the accident situation has been detected to keep lighting on or blinking and sound an alarm.

Advantageous Effects

A control system and method of the present invention enable extensive and comprehensive industrial safety control. Therefore, when the control system and method are applied to an industrial site, it is easy to cope with an accident.

Also, according to the control system and method of the present invention, whether it is necessary to rescue a worker or evacuate nearby workers in a current situation is analyzed using biometric information, location information, and surrounding environment information of a worker, and a countermeasure is taken according to the analysis result. Therefore, it is possible to prevent additional accidents.

According to the present invention, workers and worker devices are matched with each other on a one-to-one basis, and a determination is made on whether an accident has occurred in consideration of a worker's unique disease or biometric signal. Therefore, an accurate determination can be made, and it is possible to readily manage the worker devices.

Also, workers within a set range are grouped and thus can be managed in clusters. Therefore, the convenience of management is improved, and it is easy to determine an accident range when an accident occurs.

REFERENCE SIGNS LIST

Figure 1:
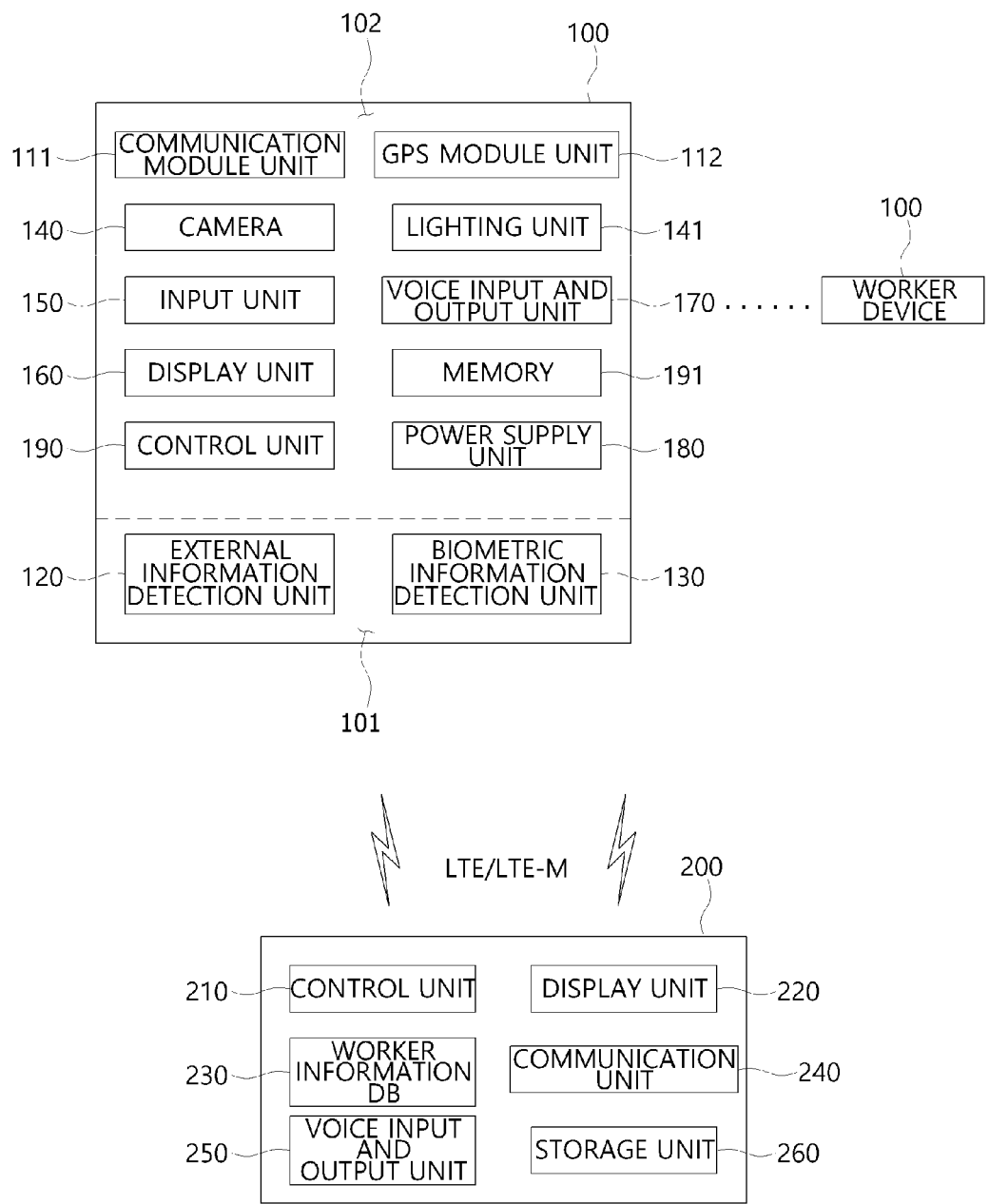
FIG. 1 is a block diagram of a control system according to an exemplary embodiment of the present invention.

100: worker device
111: communication module unit
112: GPS module unit
120: external information detection unit
130: biometric information detection unit
140: camera
150: input unit
160: display unit
170: voice input and output unit
180: power supply unit
190: control unit
191: memory
200: control server
210: control unit
220: display unit
230: worker information DB
340: communication unit
250: voice input and output unit
260: storage unit

MODES OF THE INVENTION

Hereinafter, a control system and method of the present invention will be described in detail with reference to the accompanying drawings.

Embodiments of the present invention are provided to describe the invention more fully to those of ordinary skill in the art. Embodiments described below may be modified in different forms, and the scope of the present invention is not limited thereto. Rather, these embodiments are provided so that the present invention will be thorough and complete and will fully convey the spirit of the invention to those of ordinary skill in the art.

Terms used herein are intended to describe particular embodiments and are not intended to limit the scope of the present invention. Unless the context clearly indicates otherwise, a singular form may include a plural form. As used herein, the terms "comprise" and/or "comprising" specify presence of mentioned shapes, numbers, steps, operations, members, elements, and/or groups thereof, but do not exclude presence or addition of at least one other shape, number, step, operation, member, element, and/or group thereof. As used herein, the term "and/or" includes any and all combinations of one or more of the associated listed items.

The terms "first," "second," and the like are used to describe various members, areas, and/or regions, but do not limit such members, parts, areas, layers, and/or regions. These terms do not mean a certain order, top or bottom, or priority and are used only to distinguish one member, area, or region from another member, area, or region. Therefore, a first member, area, or region may indicate a second member, area, or region without deviating from the spirit of the present invention.

Embodiments of the present invention will be described below with reference to drawings which schematically illustrate the embodiments. In the drawings, illustrated shapes may change according to, for example, manufacturing technology and/or tolerance. Accordingly, the embodiments of the present invention should not be construed as limited to specific shapes of areas illustrated herein and include changes in shapes that may occur during manufacturing.

FIG. 1 is a block diagram of a control system according to an exemplary embodiment of the present invention.

Referring to FIG. 1, a control system according to an exemplary embodiment of the present invention includes a plurality of worker devices 100 which are worn by workers, detect and transmit locations, biometric information, and surrounding information of the workers, and notify the workers of an external order, and a control server 200 which determines status of the workers using biometric information received from the worker devices 100 and performs control by transferring a command to worker devices nearby the corresponding worker device 100 using the surrounding information so that a worker involved in an accident may be rescued or workers may evacuate from the corresponding area.

Each of the worker devices 100 includes a communication module unit 111 which communicates with the control server 200, a Global Positioning System (GPS) module unit 112 which detects a location of the worker device 100, an external information detection unit 120 which detects external information, a biometric information detection unit 130 which detects biometric information of a worker who is a wearer, a camera 140 which takes pictures of a direction of the worker's sight, a lighting unit 141 which illuminates the direction of the worker's sight, an input unit 150 which receives a manual input of the worker, a voice input and output unit 170 for voice communication between workers or between the worker and the control server 200, a display unit 160 which displays an image message of the control server 200, a memory 191 for storing data and an application, and a control unit 190 for control over each unit, and a power supply unit 180 which supplies power.

The control server 200 includes a control unit 210, a display unit 220, a worker information database (DB) 230, a communication unit 240, a voice input and output unit 250, and a storage unit 260.

The aforementioned configuration and operation of the control system according to an exemplary embodiment of the present invention will be described in further detail below.

First, the worker device 100 may be a wearable device which may be worn by a worker such as a band type, a helmet type, and a belt type. The worker device 100 may be composed of one piece of hardware or a plurality of combinable devices.

Here, the plurality of combinable devices do not denote one device into which the aforementioned components of the worker device 100 are integrated but rather denotes a plurality of devices in which the aforementioned components are disposed in a distributed manner.

For example, a smart phone of a worker may be used for the communication module unit 111, the GPS module unit 112, the camera 140, the lighting unit 141, the input unit 150, the display unit 160, the voice input and output unit 170, the control unit 190, and the memory 191 in the configuration of the worker device 100, and at least the external information detection unit 120 and the biometric information detection unit 130 may be installed in a wearable device. In this case, the smart phone and the wearable device may be connected to each other in a communication manner such as Bluetooth.

The worker device 100 is suitable for each individual worker who works in a large-scale industrial site but can be extensively used in a small-scale industrial site or for leisure and home activities.

In a general industrial site, pieces of safety equipment such as safety helmets and safety belts are collectively managed. Specific safety gear is not designated for each individual worker, and each individual worker wears safety gear before moving to a location for work. Therefore, workers do not correspond to safety gear on a one-to-one basis. When arbitrary workers wear the worker devices 100 and move to the site in this manner, it is not possible to specify which worker corresponds to biometric information received by the control server 200 from a specific worker device 100.

To prevent this, a manager may be arranged to distribute the worker devices 100 to workers and record the distributed worker devices 100 and workers who receive the distributed worker devices 100 on a one-to-one basis. However, this is time-consuming.

Figure 2:
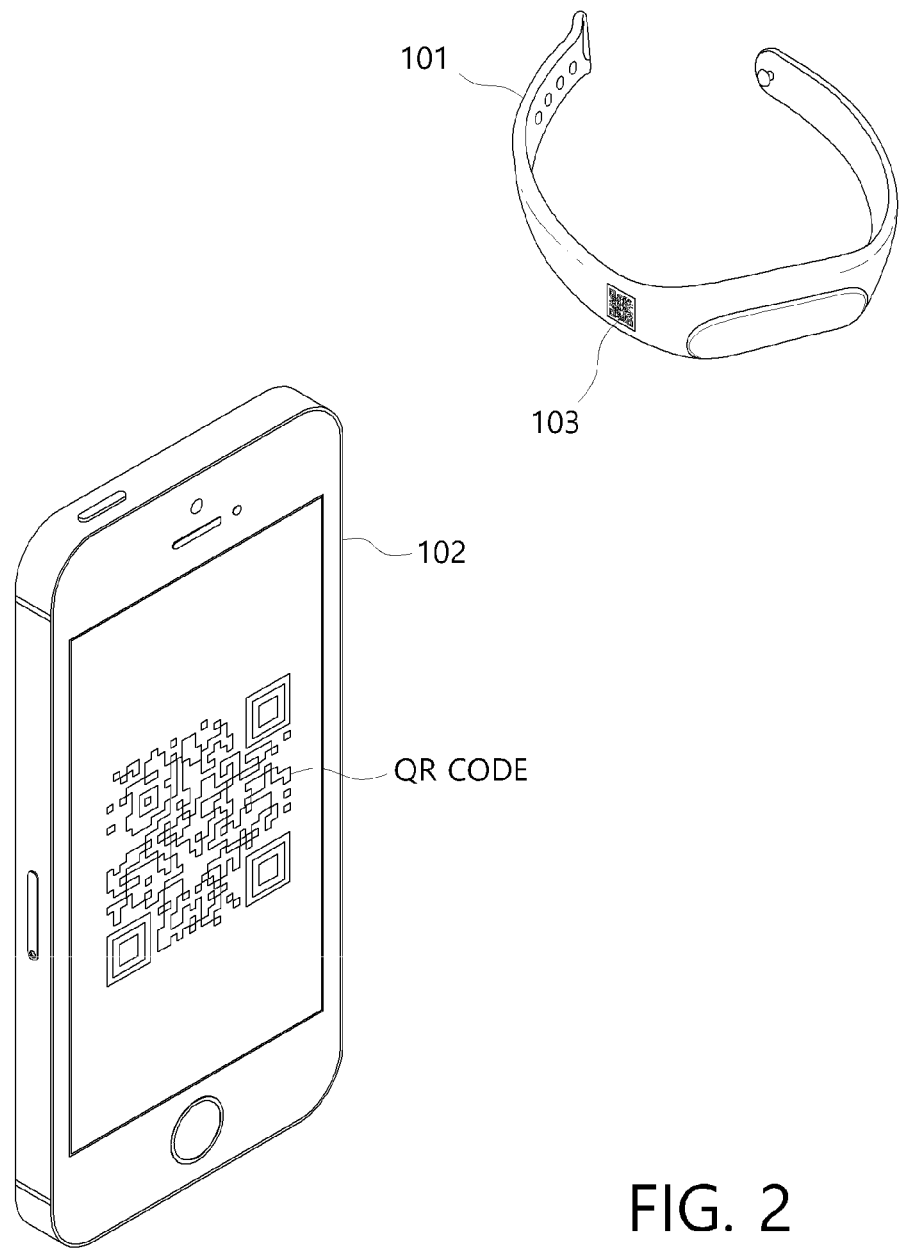
FIG. 2 is an explanatory view illustrating interoperation between a worker and a worker device in the present invention.

FIG. 2 is an explanatory view illustrating interoperation between a worker and a worker device in the present invention.

Referring to FIG. 2, when the worker device 100 is composed of a smart phone 102 and a wearable device 101, a worker scans a quick response (QR) code 103 provided on a part of the wearable device 101 to be worn using the smart phone 102 and transmits the scanned QR code 103 to the control server 200.

The scanned QR code 103 includes an identity (ID) of the wearable device 101, and the smart phone 102 has a unique number for specifying the worker (a serial number of the device, a phone number, application login information, etc.). Therefore, the control server 200 may match the specific worker with the specific worker device 100 on a one-to-one basis.

More specifically, the worker runs a QR code scanning application of the smart phone 102 and scans the QR code 103 provided on the wearable device 101 which is a part of the worker device 100 to be worn.

The application of the smart phone 102 transmits the scan result and user information, which is set, to the control server 200 through the communication module unit 111.

The communication module unit 111 may selectively use a known communication method but may use Long Term Evolution (LTE) or LTE category M1 (LTE-M) in which voice and data communication is enabled and little interference is caused by interference objects.

The scan result and the user information transmitted through the communication module unit 111 are received through the communication unit 240 of the control server 200 and stored in the storage unit 260. Records stored in the storage unit 260 are daily records of workers and the worker devices 100 worn by workers. Therefore, it possible to clarify responsibility for loss or damage to the worker devices 100. In other words, management of the worker devices 100 is facilitated.

Unlike the above example, a QR code including information on a worker may be printed on the worker's field pass, and a worker device 100 worn by the worker may be used to take a picture of the QR code and transmit the picture to the control server 200 so that the specific worker may be matched with the worker device 100 worn by the worker.

The important reason that workers and the worker devices 100 are matched with each other is to determine whether the workers' biometric signals received from the worker devices 100 are normal after the workers' diseases or unique biometric signal characteristics are stored in the worker information DB 230. For example, criteria for abnormality may be adjusted and applied to workers whose usual heart rates are higher than a normal range or whose biometric signals related to blood pressure are higher than a normal range due to hypertension or hypotension. Also, different criteria for whether a body temperature is normal may be applied to workers.

Figure 3:
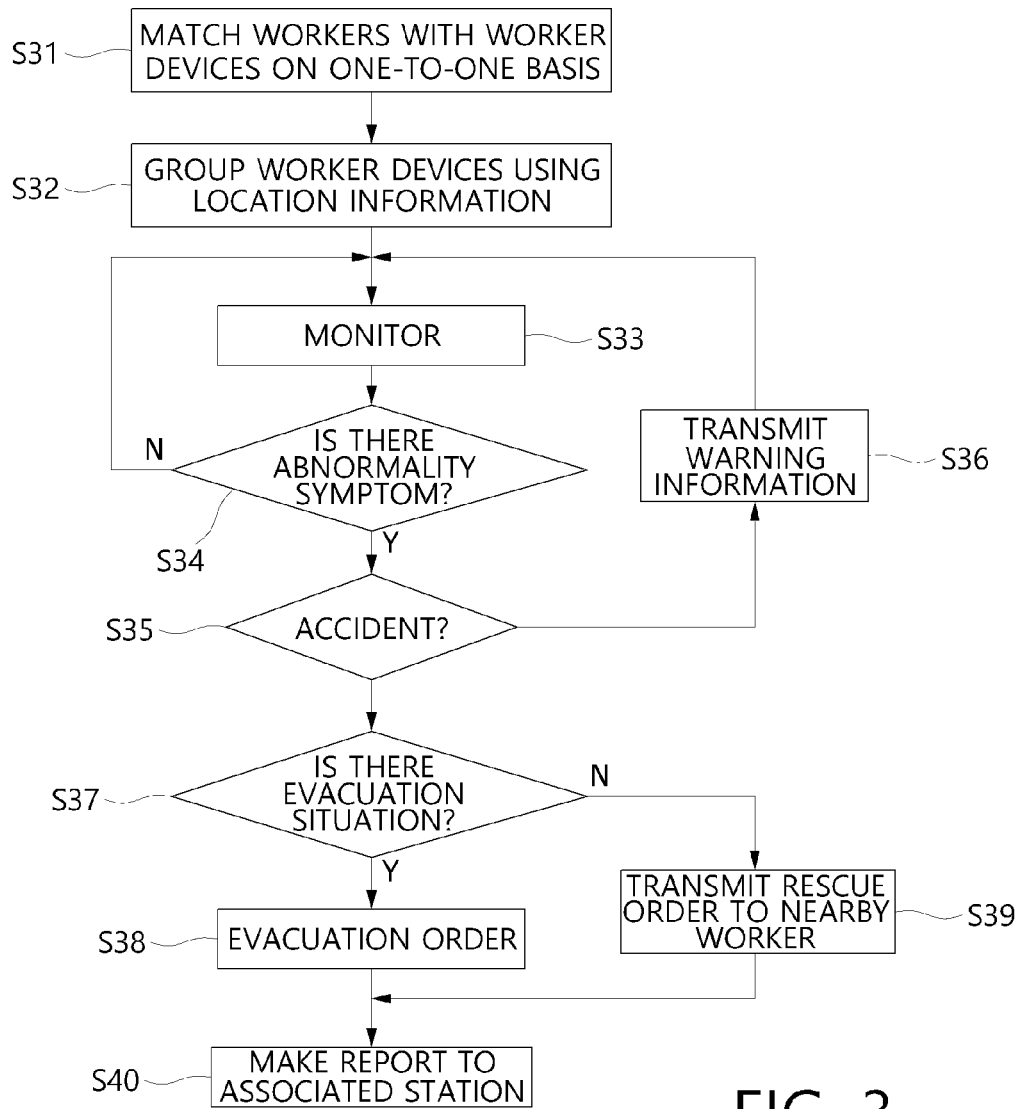
FIG. 3 is a flowchart of a control method according to an exemplary embodiment of the present invention.

FIG. 3 is a flowchart of a control method according to an exemplary embodiment of the present invention.

Referring to FIG. 3, after the operation of matching workers with the worker devices 100 as described above (S31), the control server 200 receives, in operation S32, location information from the worker devices 100 when workers work at locations for work and groups workers within a set range.

The set range may vary according to workplaces and may be adjusted according to impact of an accident. For example, the set range for grouping may be increased for a site in which harmful gas is used or handled and may be reduced for a site in which there are many works at heights.

More preferably, the set range for grouping may be determined in consideration of a usual diffusion rate of harmful gas which is used or handled.

Grouping facilitates management and makes it advantageous, when an accident occurs to a specific worker, to notify workers in the same group as the specific worker that an accident has occurred and guide the workers to take an emergency measure. Also, grouping makes it easy to check a range of an accident.

After grouping is finished, the control server 200 monitors location information, external information, and the workers' biometric information received from the worker devices 100 in operation S33.

Monitoring includes a case in which the control server 200 is notified that an accident has occurred directly through the input unit 150 of the worker device 100 worn by a specific worker and also includes a worker's voice signal transmitted through the voice input and output unit 170 and the communication module unit 111 of the worker device 100.

The external information is information detected by the external information detection unit 120 of the worker device 100, and the external information detection unit 120 may include various sensors such as a gas sensor for measuring the amounts of carbon dioxide and oxygen in the air, a vibration sensor for sensing vibrations of a facility or an earthquake, and a live-line sensor for detecting a voltage.

The biometric information is information detected by the biometric information detection unit 130 of the worker device 100. The biometric information detection unit 130 includes a heart rate sensor, a body temperature sensor, and a blood pressure sensor and periodically checks and transmits a worker's heart rate, body temperature, and blood pressure to the control server 200.

During operation S33, whether an abnormality symptom is detected is monitored in operation S34. Abnormality symptoms include an external information abnormality and a biometric information abnormality. When a detected $CO_2$ ratio is higher than a general $CO_2$ ratio of the air, when vibrations are detected, or when biometric information detected by the biometric information detection unit 130 is slightly changed, the control unit 210 of the control server 200 determines that an abnormality symptom is detected.

However, such detection of an abnormality symptom is not intended to directly cope with an accident but rather is intended to prevent an accident.

After sensing that an abnormality symptom is detected, the control server 200 determines whether to determine a current abnormality as an occurrence of an accident in operation S35. The determination of an accident occurrence is made in consideration of continuity of the abnormality symptom, and it is determined whether detected pieces of information exceed reference values.

When it is determined in operation S35 that the current abnormality is not an accident, the control server 200 transmits, in operation S36, warning information to the worker device 100 in which the abnormality symptom has been sensed.

As the warning information, a manager's voice input through the voice input and output unit 250 of the control server 200 may be transmitted through the communication unit 240 and transferred to the worker through the voice input and output unit 170 of the worker device 100 during a direct call to the worker. An alarm or a warning message stored in the storage unit 260 may be transmitted to the worker device 100 through the communication unit 240 so as to be output through the voice input and output unit 170 of the worker device 100 or displayed in the display unit 160.

The alarm or the warning message may not be directly transmitted from the control server 200. Rather, a signal for outputting an alarm or a warning message stored in the memory 191 of the worker device 100 may be transmitted from the control server 200 to the worker device 100 so that the alarm or the warning message may be output.

The worker who receives the warning information may check surrounding facilities and prevent an accident.

Although it has been described above that the control server 200 senses an abnormality symptom and notifies each individual worker device 100 of the abnormality symptom, the control unit 190 of the worker device 100 which senses vibrations or a $CO_2$ concentration may output a warning sign or an alarm through the display unit 160 or the voice input and output unit 170 so that the worker may be notified of an abnormality symptom and carry out a prevention activity.

When it is determined in operation S35 that an accident has occurred, the control unit 210 of the control server 200 determines whether it is an evacuation situation in operation S37.

The evacuation situation may be determined according to a cause and a scale of the accident. For example, the evacuation situation may correspond to a case in which the range of an accident may be extended, such as leakage of toxic gas, a case in which accidents have simultaneously occurred within a wide range such as partial or total collapse of a building, and the like.

In the case of leakage of toxic gas, workers without protection gear such as an oxygen respirator and the like may be harmed when the accident range is extended. In the case of collapse, it is necessary to evacuate other workers around the accident location due to the possibility of additional collapse.

As described above, the worker devices 100 of the present invention are matched with specific workers on a one-to-one basis and grouped according to locations thereof. When information related to an accident occurrence is detected from a plurality of worker devices 100 belonging to the same group, it is possible to determine that a wide-range accident has occurred rather than a single accident.

In particular, it is easy to specify a range of an accident, and when an accident occurs, it is possible to immediately determine the number of people involved in the accident.

When it is determined that the evacuation situation is occurring, the control unit 210 of the control server 200 may transmit a voice order to individual worker devices 100 at the site to evacuate through the voice input and output units 170 or transmit an evacuation message stored in the storage unit 260 to each worker device 100 in operation S38.

Also, a target to which the evacuation order will be transmitted may be designated according to a cause of the accident. The control unit 210 of the control server 200 may transmit the evacuation order to worker devices 100 within a specific range from an accident location according to a manual predetermined corresponding to a small-scale collapse or a characteristic of leaked gas which is diluted in the air.

When it is determined in operation S37 that an accident has occurred but the evacuation situation is not occurring, the control unit 210 of the control server 200 transmits a rescue order to a worker device nearest to the worker device 100 at the accident location or worker devices within a predetermined range from the worker device 100 in operation S39.

In this case, the rescue order may also include a voice, an alarm, and a rescue message.

Along with this, the control unit 210 of the control server 200 controls the worker device 100 of the worker involved in the accident.

At this time, control is performed through the application installed in the worker device 100. The lighting unit 141 provided in the worker device 100 is controlled to be turned on or blink continuously so that rescuers who are near to the worker involved in the accident and have received the rescue order may easily find the worker. Also, the voice input and output unit 170 may be controlled to repeatedly sound an alarm stored in the memory 191 so that a location of the worker involved in the accident may be easily found.

Along with this, the control unit 210 of the control server 200 acquires an image by operating the camera 140 provided in the worker device 100 of the worker involved in the accident. In this way, it is possible to determine a surrounding situation and take an appropriate measure for the situation. For example, when it is determined that the worker involved in the accident has been buried through the acquired image, it is possible to send additional equipment and rescuers.

Also, a manager may continuously check external information and biometric information received from the worker device 100 of the worker involved in the accident and share the information with rescuers and attempt telephonic communication through the voice input and output unit 170 to check whether the worker involved in the accident is conscious.

Most cases of the rescue order rather than the evacuation order may correspond to a worker's injury from a fall and an impact accident caused by a falling object and may also correspond to an unconsciousness state caused by a disease and the like.

Therefore, whether the worker involved in the accident is conscious may be checked, and before it is determined that the accident has occurred, a cause of the accident may be determined using information received from the worker device 100 of the worker involved in the accident. It is possible to take an appropriate measure for the cause of the accident.

During this process, the control server 200 notifies the concerned authorities, such as a fire station and a hospital, that an accident has occurred in operation S40.

As described above, according to the present invention, other workers around a worker involved in an accident may be guided to evacuate in consideration of a cause and a scale of the accident so that an additional accident may be prevented. Also, signs of accidents are sensed, and workers may be guided to carry out prevention activities against accidents so that occurrence of accidents may be reduced.

Figure 4:
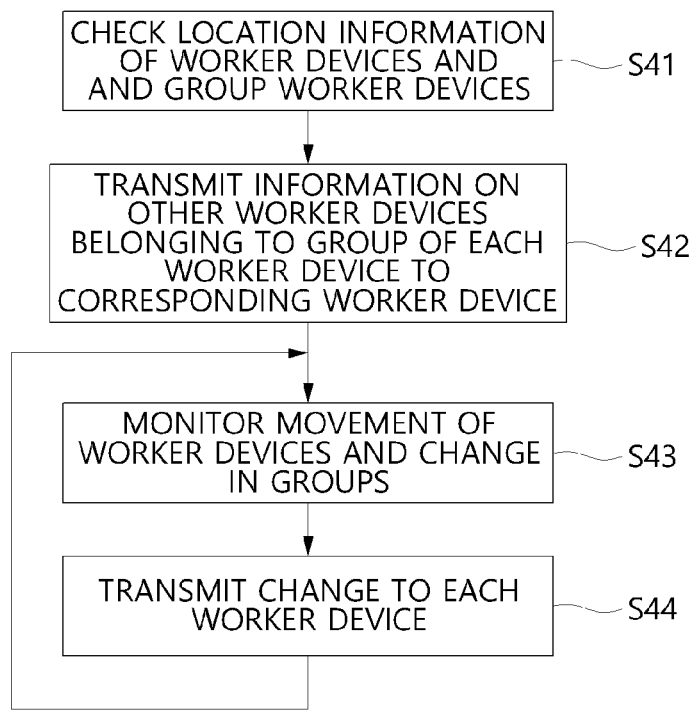
FIG. 4 is a flowchart of a control method according to another embodiment of the present invention.

FIG. 4 is a flowchart of a control method according to another embodiment of the present invention, illustrating detailed effects of the above-described grouping.

As described above, according to the present invention, other worker devices within a set range from a specific worker device 100 are grouped. It has been described above that the control server 200 senses and notifies occurrence of an abnormality symptom and each worker device 100 is notified of an accident detection, evacuation, or rescue order under the control of the control server 200.

In addition to this, when an abnormality symptom or an accident is detected, a specific worker device 100 may notify other nearby worker devices 100 of the abnormality symptom or the accident irrespective of the control server 200. In this case, according to the present invention, LTE or LTE-M is used for communication between the worker device 100 and the control server 200 and among the worker devices 100, and the specific worker device 100 cannot recognize other worker devices 100 which are near thereto or in the same group as the specific worker device 100.

Therefore, after grouping, the control server 200 is required to provide information on other worker devices around each worker device 100 and provide update information on a changed group when a location for work is changed.

To this end, first, the control server 200 checks location information detected through the GPS module unit 112 of each worker device 100 and groups each worker device 100 in operation S41.

A distance from a specific worker device 100 for classifying worker devices into one group may be determined according to characteristics of an industrial site. For example, in the case of a logging site or a large-scale construction site, an area classified into one group may be relatively large.

Even when the present invention is applied to a leisure activity, such as climbing, of multiple participants, a grouping area may be relatively large. In the case of a leisure activity, such as rafting, in which a distance between groups is short, a grouping area may be set to be relatively small.

Subsequently, in operation 42, the control server 200 transmits information on worker devices 100 close to each worker device 100 to the worker device 100, and each worker device 100 stores information on nearby worker devices 100 in the memory 191.

The information on nearby worker devices 100 may be unique call IDs or phone numbers, and any type of identifier may be used as long as it is possible to selectively perform LTE and LTE-M data communication.

Subsequently, when information detected by the external information detection unit 120 or the biometric information detection unit 130 is abnormal, a specific worker device 100 transmits data to notify other nearby worker devices 100 stored in the memory 191 that an abnormality symptom is detected. At this time, location information is transmitted together so that workers wearing the other worker devices 100 may know an approximate location.

The nearby worker devices 100 receiving the data sound an alarm or display a screen so that surroundings may be checked and occurrence of an accident may be prevented.

In this way, an initial sign of an accident is detected and propagated to the vicinity at the same time, and each worker is made to pay attention to following developments of the situation so that a rapid countermeasure may be taken when an accident occurs.

When information detected by a specific worker device 100 indicates occurrence of an accident, data for notifying that an accident has occurred is transmitted to nearby worker devices stored in the memory 191 of the worker device 100.

In this case, location information of the worker device 100 which has sensed the accident is transmitted together, and data indicating a cause of the accident may be transmitted together.

In operation S43, the control server 200 periodically monitors location information of each worker device 100 and checks a change of a specific group according to movement of worker devices 100.

In other words, it is checked whether worker devices constituting the group are changed by movement of a specific worker device 100.

Subsequently, in operation S44, when a worker device 100 moves from a specific group into a range of another group and there is a change in grouping information, the control server 200 updates the grouping information stored in the storage unit 260 and transmits the updated information to worker devices 100 belonging to the corresponding group so that nearby worker device information stored in the memory 191 of each worker device 100 may be updated.

As described above, according to the present invention, the worker devices 100 are matched with workers on a one-to-one basis, and the multiple worker devices 100 are grouped according to location information. When an accident occurs, information indicating a location and a cause of the accident is automatically propagated through data communication between worker devices so that a rapid countermeasure can be taken.

Those of ordinary skill in the art should appreciate that the present invention is not limited to the above embodiments and may be variously modified and altered without departing from the technical spirit of the present invention.

INDUSTRIAL APPLICABILITY

The present invention relates to a control system and method for matching workers with worker devices, checking health conditions of the workers using biometric information of the workers, and determining whether an accident has occurred in consideration of unique biometric information of the workers. Therefore, the present invention has industrial applicability.

The invention claimed is:

1. A control system comprising worker devices worn by workers to detect and transmit location information, external information, and biometric information and a control server checking the external information and the biometric information detected by the worker devices and determining whether an accident has occurred, wherein the control server selectively transmits an evacuation or rescue order to worker devices around an accident location according to a cause and a range of an accident, and wherein each of the worker devices comprises:
   a Long Term Evolution (LTE) or LTE category M1 (LTE-M) communication module unit configured to enable data and voice communication with the control server and other nearby worker devices;
   a Global Positioning System (GPS) module unit configured to detect location information;
   an external information detection unit configured to detect at least one piece of information among surrounding vibrations, voltage, and harmful gas;
   a biometric information detection unit configured to detect at least one piece of information among a worker's temperature, heart rate, and blood pressure;
   a camera and a lighting unit configured to take pictures of and illuminate a direction of the worker's sight;
   a quick response (QR) code configured to be provided on a part;
   a voice input and output unit configured to input and output voice signals;
   a control unit configured for control; and
   a memory configured to store an application for matching the worker devices with the worker on a one-to-one basis.

2. The control system of claim 1, wherein at least the camera and the memory are installed in a smart phone of the worker, and the workers and the worker devices are matched with each other on a one-to-one basis by scanning the QR codes with the camera and transmitting an identity (ID) of the application or a phone number to the control server together with a scan result.

3. The control system of claim 1, wherein when the worker devices are an all-in-one type, the workers and the worker devices are matched with each other on a one-to-one basis by scanning the QR codes for recognizing the worker and transmitting information for identifying the worker device to the control server together with a scan result.

4. The control system of claim 1, wherein the control server groups other worker devices within a set range from each worker device by checking location information of each of the worker devices and transmits an evacuation or rescue order to other worker devices in a group of a specific worker device when information detected from the specific worker device indicates an accident situation.

5. The control system of claim 4, wherein the control server transmits information on other worker devices in a group, to which each of the worker devices belongs, to each of the worker devices so that the information is stored in memories, and when an accident occurs, the worker devices propagate occurrence of the accident to other worker devices in groups stored in memories.

6. The control system of claim 1, wherein the control server controls a worker device determined to be involved in an accident to keep the lighting unit on or blinking and sound an alarm through the voice input and output unit.

7. The control system of claim 1, wherein the control server includes a worker information database (DB) configured to store diseases or unique biometric information of the workers and determines whether the biometric information received from the worker devices is abnormal in consideration of the diseases or the unique biometric information of the workers.

8. A control method comprising:
   a) matching, by a control server, workers with worker devices on a one-to-one basis and storing matching information;
   b) checking location information of the worker devices and grouping worker devices within a set range; and c) when external information or biometric information received by the control server from a specific worker device or worker devices is determined to indicate an accident situation, transmitting an evacuation or rescue order to other worker devices in a group to which the worker device or the worker devices belong;

transmitting grouping results of operation b) to each of the worker devices so that a specific worker device stores information on other worker devices belonging to the same group as the specific worker device; and propagating, by the worker device from which the accident situation has been detected, the accident situation to other work devices belonging to the same group as the worker device from which the accident situation has been detected.

9. The control method of claim 8, wherein operation a) comprises receiving results of scanning quick response (QR) codes for identifying the workers and information for specifying the worker devices from the worker devices, or receiving results of scanning QR codes for identifying the worker devices and information for specifying the workers from the worker devices.

10. The control method of claim 8, wherein the control server controls the worker device from which the accident situation has been detected to keep lighting on or blinking and sound an alarm.

* * * * *